United States Patent
Kanemitsu et al.

(10) Patent No.: US 11,170,637 B2
(45) Date of Patent: Nov. 9, 2021

(54) NOTIFICATION DEVICE FOR SELF-DRIVING VEHICLE AND NOTIFICATION METHOD FOR SELF-DRIVING VEHICLE

(71) Applicant: SUBARU CORPORATION, Tokyo (JP)

(72) Inventors: Shohei Kanemitsu, Tokyo (JP); Tsubasa Ono, Tokyo (JP); Akiko Sugiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/942,395

(22) Filed: Jul. 29, 2020

(65) Prior Publication Data

US 2021/0082282 A1 Mar. 18, 2021

(30) Foreign Application Priority Data

Sep. 17, 2019 (JP) .............................. JP2019-168555

(51) Int. Cl.
*G05D 1/02* (2020.01)
*G08G 1/005* (2006.01)
*G08G 1/16* (2006.01)
*G06K 9/00* (2006.01)

(52) U.S. Cl.
CPC ......... *G08G 1/005* (2013.01); *G06K 9/00805* (2013.01); *G08G 1/165* (2013.01)

(58) Field of Classification Search
None
See application file for complete search history.

(56) References Cited

U.S. PATENT DOCUMENTS

| | | | |
|---|---|---|---|
| 9,881,503 B1* | 1/2018 | Goldman-Shenhar | G05D 1/0088 |
| 2015/0035685 A1* | 2/2015 | Strickland | B60Q 1/525 340/901 |
| 2019/0266859 A1* | 8/2019 | Song | G05D 1/0248 |
| 2020/0156533 A1* | 5/2020 | Lee | G06K 9/00805 |
| 2020/0380273 A1* | 12/2020 | Saez | H04W 4/40 |
| 2020/0398743 A1* | 12/2020 | Huber | B60R 21/34 |
| 2021/0055737 A1* | 2/2021 | Saleem | G06K 9/00369 |

FOREIGN PATENT DOCUMENTS

| | | |
|---|---|---|
| JP | 2015069460 A | 4/2015 |
| JP | 2017043197 A | 3/2017 |
| JP | 2018084890 A | 5/2018 |

\* cited by examiner

*Primary Examiner* — Brent Swarthout
(74) *Attorney, Agent, or Firm* — Troutman Pepper Hamilton Sanders LLP

(57) ABSTRACT

A notification device is to mounted on a vehicle and notifies a preceding person who precedes the vehicle of a presence of the vehicle during automatic traveling. The notification device includes an imaging unit configured to image the preceding person, an estimating unit configured to estimate at least characteristics of the preceding person imaged by the imaging unit, a determining unit configured to determine a notification mode for the preceding person based on an estimation result by the estimating unit, and a notification controller configured to operate a notifying unit configured to notify the preceding person of the presence of the vehicle, based on the notification mode determined by the determining unit.

12 Claims, 13 Drawing Sheets

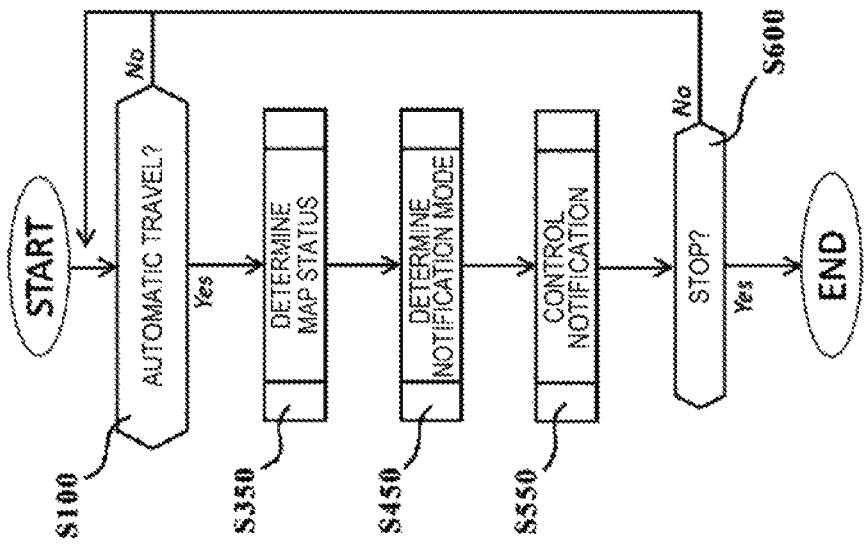

NOTIFICATION DEVICE FOR SELF-DRIVING VEHICLE AND NOTIFICATION METHOD FOR SELF-DRIVING VEHICLE

CROSS-REFERENCE TO RELATED APPLICATIONS

The present application claims priority from Japanese Patent Application No. 2019-168555 filed on Sep. 17, 2019, the entire contents of which are hereby incorporated by reference.

BACKGROUND

The disclosure relates to a notification technique that is applied to a vehicle, for example, and more specifically relates to a notification device that is mounted on a vehicle during self-driving and notifies the outside of the presence of the vehicle, and a notification method.

Automobiles are used in the modern society as movement devices, and various vehicles daily move on the roads. Preceding persons, such as a pedestrian and a person who rides on a bicycle may be present on the road on which a vehicle travels in a forward travelling direction of the vehicle. There is a scene in which these preceding persons are to be alerted to the presence of the host vehicle in some cases.

In particular, electric vehicles and hybrid vehicles with electric motors being mounted thereon have been increased in recent years, therefore, it can be said that the necessity of such an alert has been increased more and more.

To cope with the necessity, for example, Japanese Unexamined Patent Application Publication (JP-A) No. 2017-43197 discloses an alarm device capable of notifying not-visible pedestrians hidden behind shielding objects about the approach of a host vehicle, without emitting sound recognized as noise to the periphery.

SUMMARY

The accompanying drawings are included to provide a further understanding of the disclosure and are incorporated in and constitute a part of this specification. The drawings illustrate example embodiments and, together with the specification, serve to explain the principles of the disclosure.

An aspect of the disclosure provides a notification device to be mounted on a vehicle and configured to notify a preceding person who precedes the vehicle of a presence of the vehicle during automatic traveling. The notification device includes an imaging unit, an estimating unit, a determining unit, and a notification controller. The imaging unit is configured to image the preceding person. The estimating unit is configured to estimate at least a characteristic of the preceding person imaged by the imaging unit. The determining unit is configured to determine a notification mode for the preceding person based on an estimation result by the estimating unit. The notification controller is configured to operate a notifying unit configured to notify the preceding person of the presence of the vehicle, based on the notification mode determined by the determining unit.

An aspect of the disclosure provides a notification method for notifying a preceding person who precedes a presence of a vehicle during automatic traveling. The notification method includes imaging the preceding person. The notification method includes estimating at least a characteristic of the imaged preceding person. The notification method includes determining a notification mode for the preceding person based on at least, a result of the estimating. The notification method includes notifying the preceding person of the presence of the vehicle based on the determined notification mode.

An aspect of the disclosure provides a notification device to be mounted on a vehicle and configured to notify a preceding person who precedes the vehicle of a presence of the vehicle during automatic traveling. The notification device includes an imaging unit and circuitry. The imaging unit is configured to image the preceding person. The circuitry is configured to estimate at least a characteristic of the preceding person imaged by the imaging unit. The circuitry is configured to determine a notification mode for the preceding person based on an estimation result by the estimating. The circuitry is configured to operate a notifying unit configured to notify the preceding person of the presence of the vehicle, based on the determined notification mode.

BRIEF DESCRIPTION OF THE DRAWINGS

FIG. 8 is a flowchart illustrating a notification method in a second embodiment.

DETAILED DESCRIPTION

Current techniques as well as JP-A No. 2017-43197 do not appear to appropriately satisfy market needs, and have the problems.

In other words, in JP-A No. 2017-43197, the degree of alert is increased in that the frequency of alarm sound is changed in accordance with the vehicle speed, however, as will be described hereinafter it is to be said that using only the sound as the aspect of the notification lacks in pliability.

For example, a status of a road on which the vehicles travel is changed from time to time, and suitable notification modes are thus neither uniform nor equal depending on the environment.

Particularly in the self-driving, which is predicted in the future, an opportunity in which a driver intentionally and positively drives a vehicle is decreased, so that it is demanded that the status is accurately determined at the vehicle side, and a notification mode suitable for the status is executed.

It is desirable to provide a notification device and a notification method in which while a traveling status is accurately determined at a vehicle side, notification suitable for the status is executed with respect to a preceding person.

In the following, an embodiment of the disclosure is described in detail with reference to the accompanying drawings Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The rest of a configuration detailed below may be suitably complemented with known techniques including those disclosed in the JP-A No. 2017-43197.

First Embodiment

<Notification Device 100>

Figure 1:
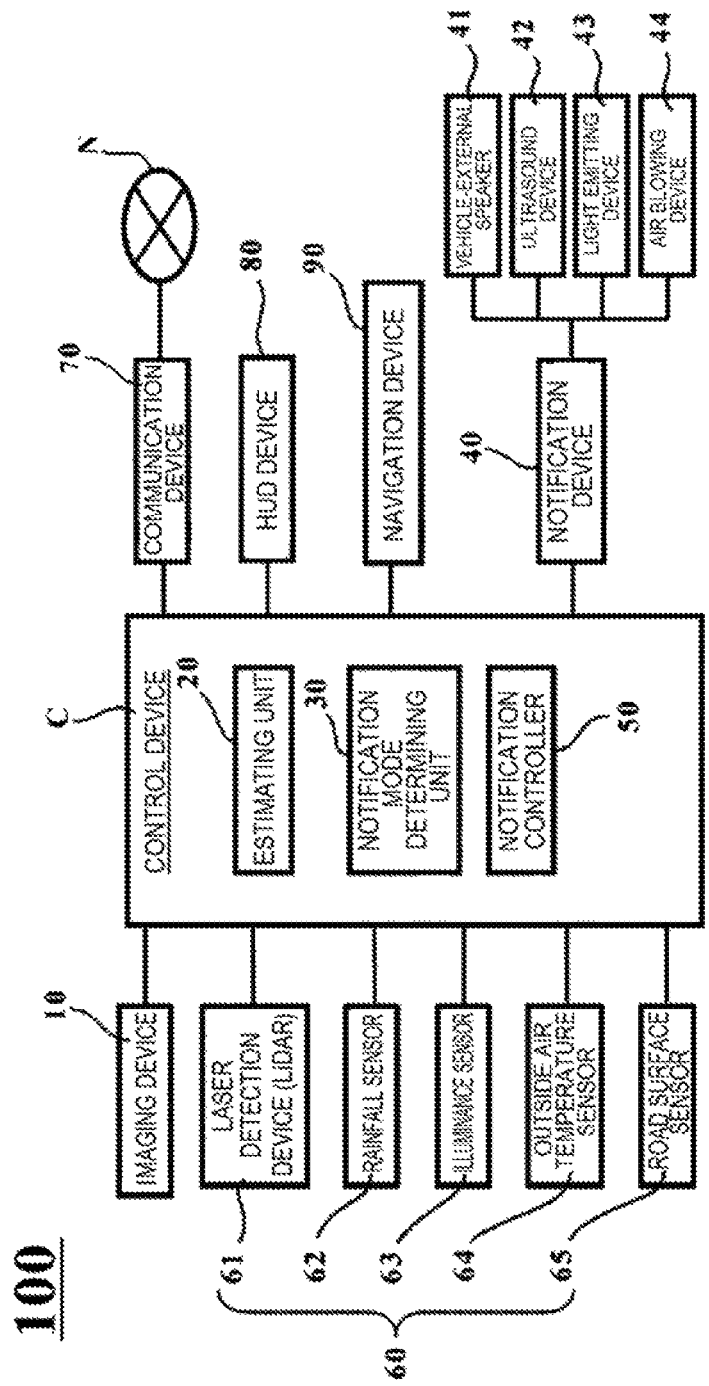
FIG. 1 is a schematic diagram illustrating a configuration of a notification device.
Figure 2:
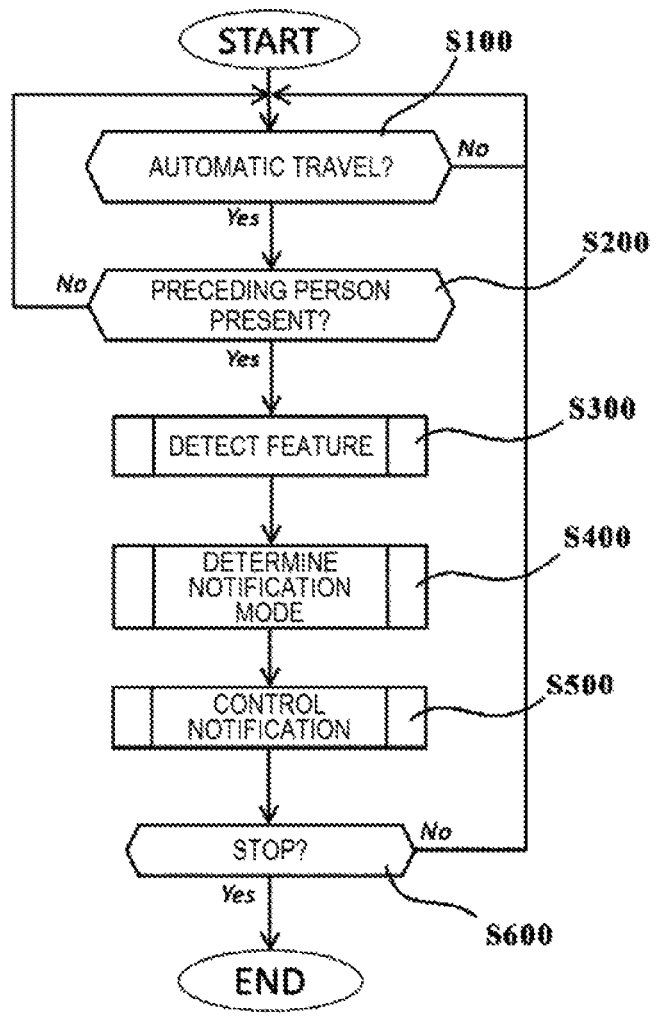
FIG. 2 is a flowchart illustrating a notification method in a first embodiment.

First, a configuration of a notification device 100 according to an embodiment of the disclosure will be described with reference to FIG. 1.

As illustrated in the drawing, the notification device 100 in the present embodiment is mounted on a vehicle V and capable of notifying a preceding person P who precedes the vehicle V of a presence of the host vehicle during automatic traveling.

Herein, examples of the "vehicle V" can include a four-wheel passenger vehicle such as SUV and a bus.

Moreover, a hybrid vehicle or an electric vehicle on which a battery and an electric motor are mounted may be employed as the vehicle V.

Moreover, the vehicle V in the present embodiment has a publicly known self-driving function as described above, however, the self-driving function is not necessarily to be used and can be omitted as appropriate. In this case, the notification device 100 in the present embodiment is mounted on the vehicle V that an elderly person, for example, drives to allow the safety to be enhanced.

The term "preceding person P" refers to a person who precedes the vehicle V. Examples of such a person include a pedestrian and a person who rides on a light vehicle such as a bicycle. Moreover, in the present embodiment, examples of the preceding person P may further include an animal, and for example, an animal other than a person, such as a dog or a cat, that, possibly appears on the road.

Moreover, the phrase "something precedes the vehicle V" refers to a state where something is present in a region from the side of the vehicle to the front in the travelling direction, and refers to, for example, that in a case of a straight line road and, something is present in front of the vehicle V in the travelling direction and enters a planned course, and that something is present at the side (lateral) of the vehicle V while traveling in the same direction as the vehicle V and possibly enters the planned course.

The notification device 100 includes an imaging device 10, an estimating unit 20, a notification mode determining unit 30, a notification device 40, and a notification controller 50. In addition, as apparent from FIG. 1, the notification device IOC may further include a sensor 60, a communication device 70, an HUD device 80, and a navigation device 90.

The imaging device 10 is capable of imaging the preceding person P. In one embodiment, the imaging device 10 may serve as an "imaging unit". As a specific example of such the imaging device 20, a publicly known onboard camera, such as a CCD camera, that can photograph an outside of the vehicle is applicable. Moreover, the number and the disposed position of the imaging devices 10 are particularly not limited as long as the preceding person P can be imaged, and for example, a plurality of CCD cameras may be mounted to obtain more pieces of imaging information.

The estimating unit 20 is capable of estimating at least characteristics of the preceding person P imaged by the imaging device 10. In one embodiment, the estimating unit 20 may serve as an "estimating unit" and the imaging device 20 may serve as an "imaging unit".

Examples of estimating the characteristics of the preceding person P include estimating which of an elderly person, an adult other than the elderly person, a child, and a handicapped person the preceding person P is likely to be, and estimating if the preceding person P has difficulty in a sense of sight and/or a sense of hearing (the details of both will be described later).

In addition, the estimating unit 20 may include at least one of a function of estimating the presence or absence of an evacuation space SP of the preceding person P, a function of estimating a feature of equipment (decorative object) held by the preceding person P, or a function of estimating an area where a large number of the preceding persons are likely to be present from map information. These functions will be described later.

The estimating unit 20 is provided in a control device C that is mounted on the vehicle V in the present embodiment. Components of the control device C can include a circuit substrate (hardware), a central arithmetic processing unit such as a CPU, and a program (software) for functioning the central arithmetic processing unit, which are publicly known.

The notification mode determining unit 30 is capable of determining a notification mode with respect to the preceding person P based on an estimation result acquired from, the estimating unit 20. In one embodiment, the notification mode determining unit 30 may serve as the "determining unit", and the estimating unit 20 may serve as an "estimating unit". Moreover, the notification mode determining unit 30 in the present embodiment is also capable of identifying a surrounding environment based on various information from the sensor 60, which will be described later.

As will be described later, as a notification mode, the notification device 100 in the present embodiment can select a notification mode from four notification modes of the sound by a vehicle-external speaker 41, the vibration by an ultrasound device 42, the light by a light emitting device 43, and the air by an air blowing device 44.

Therefore, the notification mode determining unit 30 is capable of determining whether any one of these notification modes is selected or ones of these notification modes are combined.

The notification mode determining unit 30 is provided in the control device C that is mounted on the vehicle V in the present embodiment, similar to the estimating unit 20 described above.

The notification device 40 includes at least one of the vehicle-external speaker 41, the ultrasound device 42, the light emitting device 43, or the air blowing device 44, as described above. However, the present, embodiment is not limited to this example, and for example, the air blowing device may has a heat control function and blow cold air or warm air. Moreover, as the ultrasound device 42, for example, a publicly known ultrasound generation device that uses an ultrasound transducer and has an ultrasound haptics function is applicable. Moreover, as the light emitting device 43, a publicly known LED or organic EL device is applicable.

The notification controller 50 is capable of operating the notifying device 40 in order to notify the preceding person P of the presence of the vehicle V, based on the notification mode determined by the notification mode determining unit 30 described above. In one embodiment, the notification controller 50 may serve as a "notification controller" and the notification mode determining unit 30 may serve as a "determining unit".

In addition, the notification controller 50 in the present embodiment may have at least one of a function of making the notification mode of the notifying device 40 different in accordance with the type of the preceding person P, a function of making the notification mode of the notifying device 40 different in accordance with the equipment of the preceding person P, a function of making the notification mode of the notifying device 40 different in accordance with the surrounding environment of the preceding person P, or a function of operating the notifying device 40 only when the evacuation space SP of the preceding person P is present. These functions will be described later in details.

The notification controller 50 is provided in the control device C that is mounted on the vehicle V in the present embodiment, similar to the estimating unit 20 and the notification mode determining unit 30 described above.

The sensor 60 is mounted on the vehicle V, and is capable of detecting various information. In the present embodiment, as one example, a laser detection device 61, a rainfall sensor 62, an illuminance sensor 63, an outside air temperature sensor 64, and a road surface sensor 65, which are respectively publicly known, are mounted on the vehicle V. Although the example in which the abovementioned sensors are mounted on the vehicle V is described in the present embodiment, any of the sensors may be omitted in accordance with a functional request.

Examples of the laser detection device 61 among them can include a publicly known light detection and ranging, laser imaging detection and ranging (LiDAR) system that can be used for the detection of an outside object from the vehicle V and uses pulse-shaped light beams such as laser light. In the detection of objects by using the LiDAR system, the surrounding of the vehicle V is irradiated with the abovementioned light beams, and reflection light from each object is received to detect each object from the acquired data.

Examples of the communication device 70 can include a publicly known vehicle-mounted communication device capable of performing information communication with the outside of the vehicle V, and various information such as congestion information and road traffic information can be received via the communication device 70.

The HUD device 80 is a publicly known head-up display device capable of making information directly appear in a field of view of a human being. The HUD device 80 displays a real image and a virtual image on a glass, such as a windshield or a rear glass, of the vehicle V. Although the HUD device 80 is used in the present embodiment, instead of this, for example, a large-sired liquid crystal device or an LED display device disposed to an instrument panel may be used, or a publicly known wearable device such as a head mounted display (HMD) device may be used.

The navigation device 90 is a publicly known device capable of searching for a route from the current location to a destination, based on map information stored in a memory, which is not illustrated. Therefore, the navigation device 90 in the present, embodiment can acquire a current position of the vehicle V by a GPS or the like. The map information may be held by the navigation device 90, or may be downloadable via the communication device 70 through a network N.

Moreover, examples of the network N in the present embodiment can include the Internet which is publicly known.

<Notification Method (Part 1)>

Next, with reference to FIGS. 2 to 7 as appropriate, a notification method that is executed by the control device C in the present embodiment will be described. The notification method in the present embodiment may be applicable, for example, when the vehicle V during self-driving alerts the preceding person P described above to the presence of the host vehicle.

In other words, the notification method in the present embodiment is a notification method for notifying the preceding person P who precedes a vehicle of a presence of the vehicle during automatic traveling. The notification method includes: imaging the preceding person P; estimating at least characteristics of the imaged preceding person P; determining a notification mode with respect to the preceding person Phased on a result of the estimating; and notifying the preceding person P of a presence of the vehicle V based on the determined notification mode.

Hereinafter, the respective processes will be described in details with reference to the drawings.

In the notification method in the present embodiment, whether a function of automatic traveling (self-driving) is executed in the vehicle V is firstly determined (S100). If the function of self-driving is not executed, the control device C monitors the vehicle V until the self-driving function is executed.

On the other hand, if the traveling by the self-driving is started, the control device C determines whether the preceding person P is present on a planned course of the vehicle V (S200). For example, in the present embodiment, the control device C uses the imaging device 10 to photograph a video in front of the vehicle V, and detects whether the preceding person P is present from information on the photographed video.

Alternatively, the control device C uses, instead of the imaging device 10, the laser detection device 61 to detect whether the preceding person P is present in front of the vehicle V. Alternatively, the control device C may determine whether the preceding person P is present on the planned course of the vehicle V, based on both of the information detected by the imaging device 10 and the information detected by the laser detection device 61.

Moreover, as the planned course, when a traveling route is set in the navigation device 90, map information on a traveling plan may be used, whereas when no traveling route is set, either one of the front and side of the vehicle V may be set as a planned course.

If it has been determined that the preceding person P is present on the planned course described above, the control device C subsequently performs feature detection of the preceding person P having been determined as being present (S300). A specific content of the feature detection will be described later with reference to FIGS. 3 and 4.

In subsequent notification mode determination, a notification mode suitable for the preceding person P is determined based on the detected feature of the preceding person P (S400), and the notification controller 5G described above thereafter drives the notifying device 40 in accordance with the determined notification mode (S500).

The processes from S100 to S500 in the foregoing are repeatedly executed until the vehicle V stops (S600).

[Feature Detection (Person Distinction)]

Next, with reference to FIG. 3, a feature detection related to person distinction (physical feature distinction) in the notification method in the present embodiment will be described in details. As described hereinafter, in the feature detection in the present embodiment, the estimating unit 20 of the control device C detects, based on the imaging information obtained by the imaging device 10, a body height and a motion of the preceding person P.

In other words, firstly, in the control device C, it is determined as to whether image (video) information has been acquired in the imaging device 10 as the imaging process (S301). In a case where the imaging device 10 has been used for the presence detection of the preceding person P as described above, the image information at that case can be used without any change. On the other hand, in a case where the imaging device 10 is not used for the presence detection of the preceding person P, the control device C controls the imaging device 10 to acquire image information on the preceding person P.

In the case where the image information has been acquired, the control device C performs an image analysis thereof (S302). In the image analysis, for example, a publicly known detection algorithm for a moving object such as a background difference method or a frame difference method may be used to allow various objects including the preceding person P to be detected in the image information acquired. In addition, for example, by combining publicly known person extraction algorithms, such as the algorithm described in JP-A No. 2015-69460, it is also possible to determine whether an object that moves within the image is a person.

Therefore, in the control device C (the estimating unit 20), when the preceding person P is a person, personal distinction becomes possible as an estimating process based on the analyzed result from, the image (S303a). In a case where no person is present within the acquired image and other cases, it is determined that: the presence or absence of the preceding person P cannot, be determined from the vehicle V (pattern E) (S311). In the case of the pattern E, in the notification mode determination, which is described later, a notification mode may be determined based on information on a surrounding environment, for example.

At S303a described above, if the person distinction is possible from the acquired image information, the estimating unit 20 determines whether it is possible for the preceding person P to visually recognize the vehicle V (S304). or example, the estimating unit 20 distinguishes whether the preceding person P has a white cane in the acquired video information. If the preceding person P has a white cane, the estimating unit 20 determines that it is difficult for the preceding person P to visually recognize the vehicle V (No at S304). If the preceding person P has no white cane, the estimating unit 20 estimates that it is possible for the preceding person P to visually recognize the vehicle V (Yes at S304). The determination reference related to whether to visually recognize the vehicle V is not limited to the above. For example, another publicly known feature data, such as the preceding person P being guided by a seeing eye dog, may be extracted and the determination may be made.

If the preceding person P described above can visually recognize the vehicle V, the estimating unit 20 subsequently estimates whether the preceding person P can recognize the vehicle V audibly (S305). For example, the estimating unit 20 distinguishes whether the preceding person P wears a headphone, for example, in the acquired video information. If the preceding person P wears a headphone, the estimating unit 20 determines that the preceding person P has difficulty recognizing the vehicle V audibly (No at S305). If the preceding person P wears no headphone, the estimating unit 20 estimates that the preceding person P can recognize the vehicle V audibly (Yes at S305). The determination reference related to whether to recognize the vehicle V audibly is not limited to the above. For example, another publicly known feature data, such as whether the preceding person P wear a hearing aid, may be used and the determination may be made.

By the processing being through S305 described above, it is determined as to whether the preceding person P who is analyzed with the image information can recognize the vehicle V visually and audibly (pattern A), or can recognize the vehicle V visually but has difficulty recognizing the vehicle V audibly (pattern E).

On the other hand, if the preceding person P has difficulty recognizing the vehicle V visually (No at S304), similar to the above, it is subsequently determined as to whether the preceding person P can recognize the vehicle V audibly (S308). By the processing being through S308 described above, it is determined as to whether the preceding person P who is analyzed with the image information has difficultly recognizing the vehicle V visually, but can recognize the vehicle V audibly (pattern C) or has difficulty recognizing the vehicle V visually and audibly (pattern D).

In the pattern A described above, because the recognition is possible for the preceding person P by both of sound and light, for example, notification modes of various patterns can be employed. On the other hand, in the pattern B and the pattern C, since the recognition is possible by either one of sound and light, this condition is considered in the notification mode determination, which is described later. Moreover, also in the pattern D, because both of the recognition by sound and the recognition by light are difficult, for example, a priority is given to notification modes such as ultrasound and air blowing, other than the sound and the light.

The person distinction f row the image information is not limited to the abovementioned form, but using the laser detection device 61 together, distance information on the preceding person P can be acquired, and whether the preceding person P is an adult or a child can be estimated by detecting a body height of the preceding person P, for example. Moreover, it is difficult to conclude but is possible to estimate whether the preceding person P is an elderly person, for example, by distinguishing the color of hair from the image information, for example.

[Feature Detection (Object Distinction)]

Next, with reference to FIG. 4, a feature detection related to object distinction in the notification method in the present embodiment will be described in details.

As described hereinafter, in the feature detection in the present embodiment, the estimating unit 20 of the control device C detects, based on the imaging information obtained by the imaging device 10, a feature of equipment (decorative object) held by the preceding person P.

In other words, firstly, in the control device C, similar to the above, it is determined as to whether image (video) information has been acquired in the imaging device 10 (S301). Moreover, similar to the above, in the case where the image information has been acquired, the control device C performs an image analysis thereof (S302). In the image analysis, for example, a publicly known algorithm, such as Region Convolutional Neural Networks (CNN) that uses Deep Learning may be applied, and this allows a person and equipment included in the image information to be determined. Moreover, in the image analysis, in addition to the above, for example, a publicly known algorithm of equipment detection exemplified in JP-A No. 2018-84890 and the like may be applied.

Therefore, in the control device C (the estimating unit 20), distinction (object distinction) of equipment (decorative object) held by the preceding person P from the image becomes possible based on the analyzed result (S303b). In a case where no equipment is present within the acquired image and other cases, it is determined that: the equipment of the preceding person P cannot be determined from the vehicle V (pattern E) (S311). Similar to the above, in the case of the pattern E, in the notification mode determination, which is described later, a notification mode may be determined based on information on a surrounding environment, for example.

If the distinction of the equipment of the preceding person P is possible, the estimating unit 20 subsequently determines whether the preceding person P is equipped with (carrying) a white cane, for example (S303c). If the preceding person P carries no white cane (No at S303c), the estimating unit 20 subsequently determines whether the preceding person P wears, for example, a headphone or a hearing aid (hereinafter, these devices that characterise the exhibition of a sense of hearing being difficult are referred to as "headphone or the like") (S303d).

If the preceding person P does not wear a headphone or the like at S303d, the estimating unit 20 estimates that the preceding person P can recognize the vehicle V visually and audibly, and makes a determination of the pattern A described above (S306). On the other hand, if the preceding person P wears a headphone or the like at S303d, the estimating unit 20 estimates that the preceding person P has difficulty recognizing the vehicle V audibly, and makes a determination of the pattern B described above (S307).

Moreover, if the preceding person P carries a white cane (Yes at S303c), the estimating unit 20 subsequently determines whether the preceding person P wears a headphone or the like, for example (S303e). If the preceding person P does not wear a headphone or the like at S303e, the estimating unit 20 estimates that the preceding person P can recognize the vehicle V audibly, and makes a determination of the pattern C described above (S309). On the other hand, if the preceding person P wears a headphone or the like at S303e, the estimating unit 20 estimates that the preceding person P has difficulty recognizing the vehicle v visually and audibly, and makes a determination of the pattern D described above (S320).

The abovementioned aspect of the object distinction is merely one example. For example, in the recognition propriety determination of the vehicle V by a sense of sight, other than carrying a white cane, for example, carrying or wearing publicly known equipment, such as wearing an eye bandage, that features some trouble occurring in a sense of sight may be detected. Moreover, for example, also in the recognition propriety determination of the vehicle V by a sense of hearing, publicly known another equipment, such as earflaps, that prevents the exhibition of a sense of hearing may be detected.

The estimating unit 20 in the present, embodiment can also estimate a candidate with the highest possibility, in terms of whether the preceding person P is an elderly person, an adult, of her than the elderly person, a child, or a handicapped person, using at least one of the person distinction and the object distinction described above.

In this case, as one form of a notification mode determining process, which will be described later, the notification controller 50 may emit sound from the vehicle-external speaker 41 as the notifying device 40 when the preceding person P is any one of an elderly person, an adult, and a child, for example. At that time, the notification controller 50 may further make the frequency and/or the amplitude of the sound different based on the feature of the preceding person P, for example, the frequency and the amplitude are increased in a case of an elderly person whereas only the frequency is increased in a case of an adult.

(Notification Mode Determination)

Figure 5:
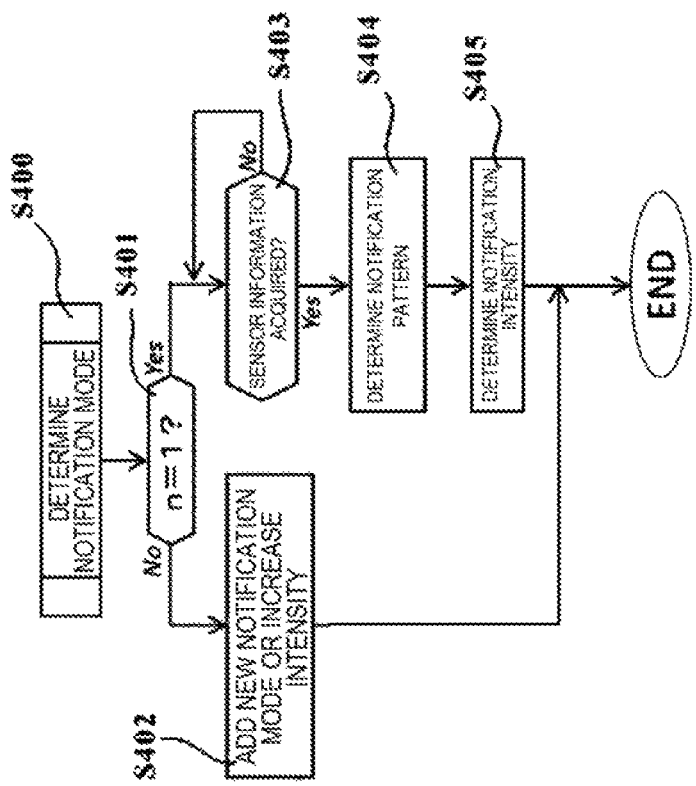
FIG. 5 is a flowchart illustrating a detail of notification mode determination in the notification method in the first embodiment.

Next, with reference to FIG. 5, notification mode determination in the notification method in the present embodiment will be described in details. As described hereinafter, in the notification mode determination in the present embodiment, the notification mode determining unit 30 of the control device C identifies a surrounding environment in which the vehicle V is present, based on at least one of illumination information, atmospheric temperature information, wind speed information or rainfall presence/absence information, from the sensor 60 that is mounted on the vehicle V.

In other words, the control device C firstly determines whether the notification mode determination is the first time at the beginning (S401). For example, the number of notifications with respect to the preceding person P is determined based on whether the preceding person P analyzed from the image information is equivalent to the one at a previous time as a reference.

If the notification mode determination is not the first time, the notification has been already made to the preceding person P at the previous time, and in this case, a determination is made as to whether a new notification mode is added or the intensity thereof is increased (S402). As for a new notification mode, tor example, when the notification mode at the previous time was the notification of sound by the vehicle-external speaker 41, a notification in which the notification of light by the light emitting device 43 is replaced or added this time may be made, for example.

On the other hand, if the notification mode determination is the first time (Yes at S401), the control device C acquires various information from the sensor 60 (S403). For example, the control device C respectively acquires information related to the presence or absence of rainfall from the rainfall sensor 62, illumination information from the illuminance sensor 63, atmospheric temperature information from the outside air temperature sensor 64, and information related to a road surface from the road surface sensor 65, all of the sensors being mounted on the vehicle V.

Moreover, the control device C may further acquire wind speed information from a wind speed sensor, which is not illustrated, mounted on the vehicle V.

Although various information are acquired from the respective sensors in the present embodiment in this manner, at least one information among illumination information, atmospheric temperature information, wind speed information, and rainfall presence/absence information may be acquired as information from the sensor 60.

The notification mode determining unit 30 having acquired the information from the sensor 60 subsequently identifies a surrounding environment in which the vehicle V is present based on the information acquired from the sensor 60, and determines a notification pattern in accordance with the surrounding environment (S404).

As one example, an example of notification patterns based on the illumination information and the wind speed information is illustrated in tables 1 and 2 as surrounding environmental information.

TABLE 1

|  |  | wind speed [m/s] | |
| --- | --- | --- | --- |
|  |  | less than B | equal to or more than 8 |
| illumination [lx] | less than A | α | γ |
|  | equal to or more than A | β | δ |

TABLE 2

|  |  | n (number of notifications) | | | | |
| --- | --- | --- | --- | --- | --- | --- |
|  |  | 1 | 2 | 3 | 4 | ... |
| notation pattern | α | sound | sound, light | sound, light, air blowing | intensity up | intensity up |
|  | β | sound | sound, air blowing | intensity up | intensity up | intensity up |
|  | γ | air blowing | intensity up | intensity up | intensity up | intensity up |
|  | δ | light | intensity up | intensity up | intensity up | intensity up |

As apparent from these tables, for example, when the illumination is less than A lux and the wind speed is less than B m/a, a normal state with no failure in the notification is determined, and the notification pattern α in the table 2 is selected. In the notification pattern α, the sound by the vehicle-external speaker 41 is selected when the number of notifications is the first time, and the light by the light emitting device 43 is added in addition to the sound at the second time.

In any of the notification patterns α to σ, the intensity is increased at the fourth time and the subsequent time, however, the upper limit is the maximum intensity in each device even with an increase in n. Moreover, as for specific numerical values of A serving as the reference of the illumination and B serving as the reference of the wind speed, any values in accordance with areas and seasons can be set.

Moreover, the illumination and the wind speed are indicated in the above as an example of the sensor information that is obtained from the surrounding environment, however, the present embodiment is not limited to the example, for example, a notification pattern may be determined based on another parameter information such as presence/absence information on the rainfall and the atmospheric temperature information.

After the notification pattern has been determined at S404, the notification mode determining unit 30 of the control device C determines notification intensity by the notification device 40 (S405). When determining notification intensity, the notification mode determining unit 30 determines an initial value thereof based on sensor information that is acquired from the sensor 60.

As examples, examples in which an initial value of the sound amount by the vehicle-external speaker 41 is determined based on the rainfall detected by the rainfall sensor 62 and is determined based on the wind speed detected by the wind speed sensor described above are respectively indicated in a table 3 and a table 4.

TABLE 3

| rainfall [mm] | sound amount [dB] |
| --- | --- |
| equal to or more than 0 and less than 1 | 60 |
| equal to or more than 1 and less than 2 | 63 |
| equal to or more than 2 and less than 5 | 66 |
| equal to or more than 5 and less than 10 | 70 |
| equal to or more than 10 and less than 20 | 75 |
| equal to or more than 20 and less than 50 | 80 |
| equal to or more than 50 and less than 80 | 85 |
| equal to or more than 80 | 90 |

TABLE 4

| wind speed [m/s] | sound amount [dB] |
| --- | --- |
| equal to or more than 0 and less than 3 | 60 |
| equal to or more than 3 and less than 5 | 65 |
| equal to or more than 5 and less than 8 | 70 |
| equal to or more than 8 and less than 10 | 75 |
| equal to or more than 10 and less than 16 | 80 |
| equal to or more than 16 | 90 |

As apparent from these tables, for example, in a case where the rainfall is less than 1 mm, for example, in a case where the wind speed is less than 3 m/s, and other cases, an initial value of the sound amount by the vehicle-external speaker 41 is set to 60 decibels, for example.

The initial value of the sound amount by the vehicle-external speaker 41 may be set based on, in addition to the rainfall and the wind speed described above, for example, another parameter such as the atmospheric temperature information obtained by the outside air temperature sensor 64. Moreover, an initial value of the ultrasound by the ultrasound device 42, an initial value of the light emission amount/intensity by the light emitting device 43, an initial value of the quantity of air by the air blowing device 44, and the like can be set based on the various parameters described above.

[Notification Control]

Figure 6:
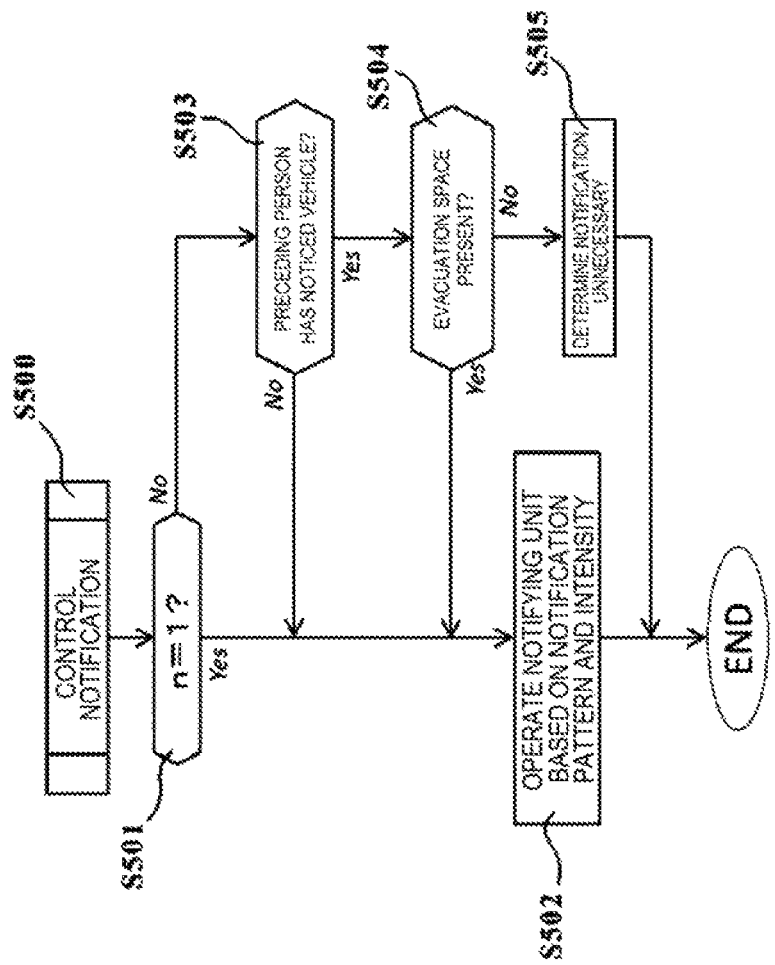
FIG. 6 is a flowchart illustrating a detail of notification control in the notification method in the first embodiment.

Next, with reference to FIG. 6, notification control in the notification method in the present embodiment will be described in details. In the notification control in the present embodiment, the notification controller 50 of the control device C controls the notification device 40 in accordance with the notification mode determined by the notification mode determination.

The notification controller 50 firstly determines whether the number of notification control is the first time. The determination reference can be determined, similar to the reference in the notification mode determination described above, based on whether the preceding person P analyzed from the image information is equivalent to the one at a previous time as a reference.

If the notification control is the first time (Yes at S501), the notification controller 50 operates the notifying unit (the notification device 40) based on the notification pattern and the intensity determined by the notification mode determination (S502). On the other hand, if the notification control is the second time and the subsequent time (No at S501), the notification controller 50 determines whether the preceding person P has noticed the vehicle V (S503). For example, the notification controller 50 detects that the preceding person P faces back after having faced the front in the travelling direction, based on the image information from the imaging device 10, using the publicly known face detection algorithm or the like, thereby estimating that the preceding person P has noticed the vehicle V.

If it has been determined that the preceding person P does not notice the vehicle V (No at S503), the notification controller 50 operates again the notifying unit (the notification device 40) based on the notification pattern and the intensity determined by the notification mode determination (S502). For example, when the notification mode described above is the "pattern α", the notification by light, in addition to by sound is made in n=2.

The notification controller 50 determines whether the preceding person P has reacted to the notification by the notification device 40, based on the imaging information by the imaging device 20, for example, and if it is determined that the preceding person P does not react to the notification, can operate the notification device 40 in a notification mode different from the notification mode at the previous time.

If it is determined that the preceding person P has noticed the vehicle V (Yes at S503), the notification controller 50 determines whether the evacuation space SP is present for the preceding person P in the status (S504). If it is determined that the evacuation space SP is present at S504, the notification controller 50 operates again the notifying unit (the notification device 40) based on the notification pattern and the intensity determined by the notification mode determination (S502). On the other hand, it is determined that the evacuation space SP is not present, the notification controller 50 determines that the notification is unnecessary, and cancels the operating of the notifying unit (the notification device 40) (S505).

Here, the determination of the evacuation space SP described above will be described with reference to FIG. 7.

As illustrated in the drawing, the notification controller 50 determines an area type of a side (left side in a case of left hand traffic) of the preceding person P who precedes the vehicle V. In the determination of the area type, for example, the image information acquired from the imaging device 10 may be analyzed, or the analysis may be made based on the map information.

As one example, a determination example of the evacuation propriety by the notification controller 50 is illustrated in a table 5.

TABLE 5

| area content | distance to area | evacuation propriety |
|---|---|---|
| sidewalk | unlimited | ✓ |
| wall | equal to or more than 0.8 | ✓ |
| wall | equal to or less than 0.8 | X |

Figure 7B:
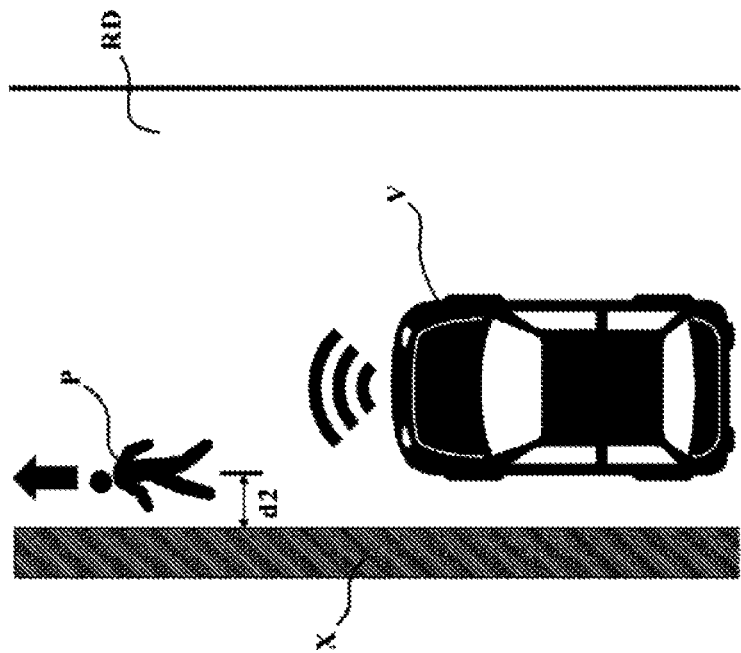
FIGS. 7A and 7B are a schematic diagram for explaining a detail of evacuation determination of a preceding person on a road.
Figure 7A:
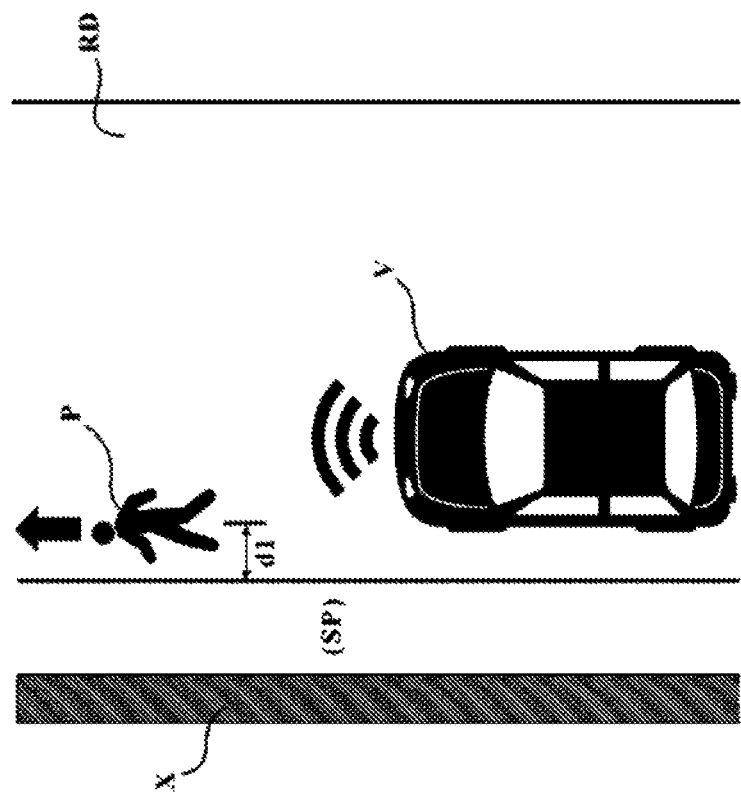

As apparent from the table 5 and FIG. 7A, the notification controller 50 determines that the evacuation of the preceding person P is possible when analyzing image information acquired from the imaging device 10, for example, and determining that a sidewalk is present at a side of the preceding person P who is walking on a road RD. In this case, a distance d1 from the preceding person P to the sidewalk (evacuation space SP) is unlimited, and it is determined that the evacuation is possible regardless of the length of the distance.

In the present example, the notification controller 50 determines the presence or absence of the evacuation space SP based on the image information, but may determine the presence or absence of the evacuation space SP based on the map information, or may determine the presence or absence of the evacuation space SP based on both of the image information and the map information. Alternatively, the notification controller 50 may determine the presence or absence of the evacuation space SP using the laser detection device 61, or may determine the presence or absence of the evacuation space SP based on both of a detection result by the laser detection device 61 and an imaging result (image information) by the imaging device 10.

On the other hand, as illustrated in the table 5 and FIG. 7B, when no sidewalk is present at a side of the preceding person P and an obstacle X is present (for example, as illustrated in the drawing, when a wall serving as the obstacle X is present), the notification controller 50 determines whether a distance d2 from the preceding person P to the obstacle X is within a predetermined distance. As one example, in the present embodiment, when the distance d2 from the preceding person P to a wall serving as the obstacle X is 0.8 m or longer, it is determined that the evacuation of the preceding person P is possible. In the present embodiment, as one example, "0.8 m" is used as a reference of the evacuation propriety, however, the reference of the evacuation propriety is not limited to this numerical value but can be set as appropriate.

With the notification device and the notification method in the first embodiment described in the foregoing, it is possible to execute, while accurately determining a traveling status at the vehicle V side, the notification suitable for the status with respect to the preceding person P.

Particularly, the control device C (the notification controller 50) in the present embodiment can make a notification mode of the notification device 40 different in accordance with the type of the preceding person P. Moreover, the control device C (the notification controller 50) can make a notification mode of the notification device 40 different in accordance with the equipment of the preceding person P. Moreover, the control device C (the notification controller 50) can make a notification mode of the notification device 40 different in accordance with the status in the surrounding environment. Moreover, the control device C (the notification controller 50) can operate the notification device 40 when it is determined that the evacuation space SP of the preceding person P is present.

As described above, in the present embodiment, after the feature detection of the preceding person P is performed, the notification mode determining unit 30 determines a notification pattern, however, the disclosure is not limited this aspect. For example, in a case where the feature detection of the preceding person P cannot be performed in the above-mentioned manner and in a case where the feature detection is omitted, the notification control with respect to the preceding person P may be performed based on the notification pattern determined by the notification mode determining unit 30 based on the information that has been acquired from the surrounding environment.

Second Embodiment

Next, a notification device and a notification method according to a second embodiment will be described with reference to FIG. 1 and FIGS. 8 to 11. In the present embodiment, the same configurations as already described in the first embodiment are denoted with the sane reference numerals, and explanations thereof are omitted as appropriate.

As understood from these drawings, the notification device in the present embodiment is a notification device that notifies a preceding person who precedes the vehicle V during automatic traveling of a presence of the vehicle V, and includes an area information acquiring unit that acquires information on an area related to a planned course on which the vehicle V travels, a laser detector that detects whether a preceding person is present on the planned course, and a notification controller that operates a notifying unit in the area based on information on the area and a detection result by the laser detector.

The notification method in the present embodiment that notifies the preceding person P who precedes the vehicle V during automatic traveling of a presence of the vehicle V includes an area information acquiring process that acquires information on an area related to a planned course on which the vehicle V travels, a laser detecting process that detects whether a preceding person is present on the planned course, and a notifying process that makes a notification in the area based on information on the area and a detection result by the laser detector.

Hereinafter, the respective processes will be described in details with reference to the drawings.

In the notification method in the present embodiment, similar to the first embodiment, whether a function of automatic traveling (self-driving) is executed in the vehicle V is firstly determined (S100).

On the other hand, if the traveling by the self-driving has been started, the control device C performs a determination of an area status (S350), and determines a notification mode based on the status of the area (S450). The control device C then performs notification control in accordance with a notification mode determined by the notification mode determination (S550).

The processes from S100 to S550 in the foregoing are repeatedly executed until the vehicle V stops (S600).

[Area Status Determination (Part 1)]

Figure 9:
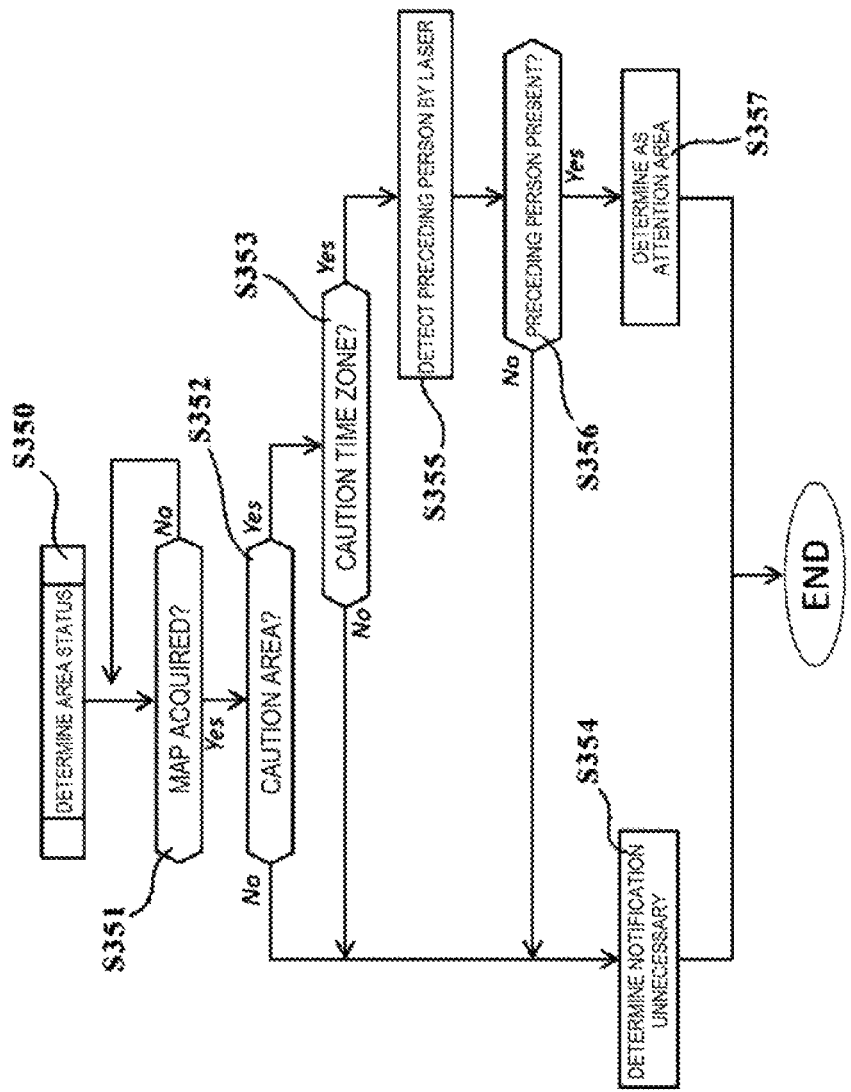
FIG. 9 is a flowchart illustrating a detail of area status determination (part 1) in the notification method in the second embodiment.
Figure 10:
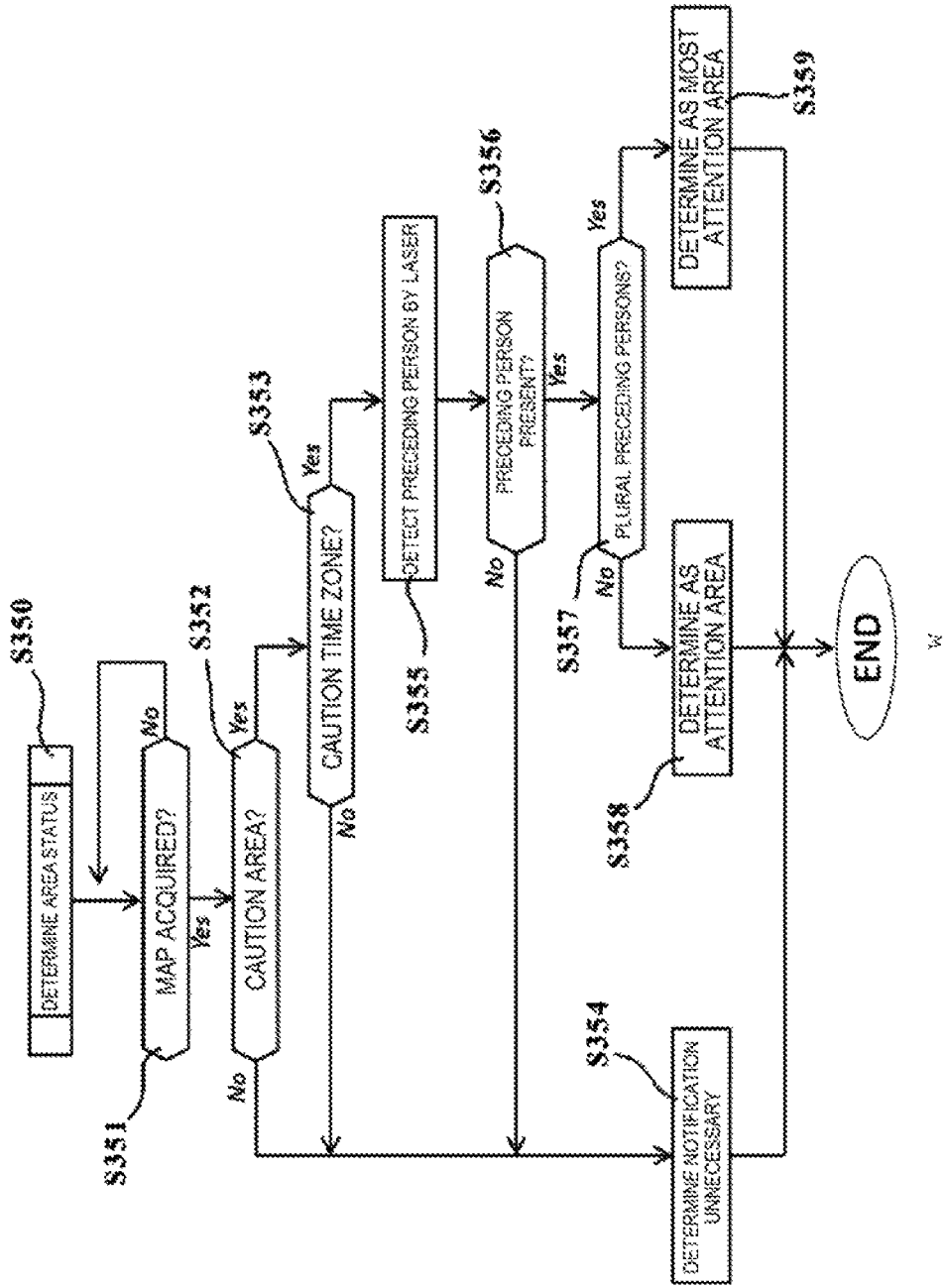
FIG. 10 is a flowchart illustrating a detail of area status determination (part 2) in the notification method in the second embodiment.

Next, with reference to FIG. 9, area status determination (part 1) in the notification method in the present embodiment will be described in details.

The control device C firstly determines whether map information has been acquired as the area information acquiring process (S351), and determines, if the map information has been acquired, whether a planned course includes a caution area based on area information on the planned course on which the vehicle V travels (S352).

Herein, the "caution area" in the present embodiment is referred to as an area where a large number of the preceding persons P are likely to be present, and examples thereof can include the periphery of a station, the periphery of a school, a busy street such as a street: of stores, the periphery of a park, or an area with information on many accidents. Moreover, in the present embodiment, the presence possibility of the preceding person P is not only simply estimated, but also the concept of "caution time zone" is introduced, so that the presence of the preceding person P is estimated by considering a real time zone. The "caution time zone" in the present embodiment is referred to as a time zone having a higher appearance possibility customarily and statistically of the preceding person P in the area, than other time zones.

An example of combinations of such the caution area and the caution time zone is illustrated in a table 6.

TABLE 6

| caution area | caution time zone |
| --- | --- |
| periphery of station | electric train traveling hours + 1 h |
| periphery of school | commute-to-and-from-school time zone |
| busy street | business hours of stores + 1 h |
| area with information on many accidents | 24 hours |

Therefore, as illustrated in FIG. 9, in the planned course on which the vehicle V travels, for example, if the planned course includes "the periphery of a station (for example, within a radius of several hundred meters from the station)" (Yes at S352), the estimating unit 20 of the control device C determines that a caution area is present at S352. On the other hand, if the areas illustrated in table 6 are not present in the abovementioned planned course (No at S352), the estimating unit 20 determines that the notification by the notification device 40 is unnecessary (S354).

If it has been determined that a caution area is present in the planned course at S352 above, the estimating unit 20 of the control device C subsequently determines whether the caution time zone includes a time zone in which the vehicle V passes through the caution area (S353). If it is determined that a time zone in which the vehicle V passes through the caution area is not the caution time zone, similar to the above, the estimating unit 20 determines that the notification by the notification device 40 is unnecessary (S354).

In the present embodiment, the "caution time zone" relative to the "caution area" is also considered, however, the necessity or unnecessity of notification may be determined by further considering "the extent of the number of persons" detected by the laser detection device 61, which will be described later.

For example, in the abovementioned caution area, a case where the average detection number of persons that is detected by the laser detection device 61 per a predetermined range (for example, each 1 m in the surrounding of the vehicle V) is three persons or more is defined as "great in number" and a case being less than three persons is defined as "few in number". "Three persons" as a reference value of the abovementioned average detection number of persons is merely one example, and another value may be set as appropriate.

As illustrated in a table a 7 next, the estimating unit 20 of the control device C may execute the notification even when it is not in the caution time zone, in a case where a caution area is present in the planned course and the number of the preceding persons P that are actually detected in the area is great in number.

TABLE 7

| relevant area | | out of caution time zone | in caution time zone |
|---|---|---|---|
| preceding person | few in number | notification unnecessary | notification |
| | great in number | notification | notification |

Moreover, the "caution time zone" in accordance with the area type is considered in the table 7, however, the caution time zone may be set uniformly such as that in a table 8, for example, irrespective of the characteristics of the area. In the table 8, the reference of the average detection number of persons pet a predetermined range described above is defined as five persons

TABLE 8

| | | time zone | |
|---|---|---|---|
| relevant area | | other hours | 7 am to 10 pm |
| preceding person | less than five persons/m | notification unnecessary | notification |
| | equal to or more than five persons/m | notification | notification |

If it has been determined that the vehicle V passes through the caution area in the caution time zone at S353 above, the control device C subsequently detects whether the preceding person P is actually present in the caution area using the laser detection device 61, as a laser detection process (S356). The control device C may detect whether the preceding person P is present in at least either one of the front and side of the vehicle V using the laser detection device 61 in this time.

If the presence of the preceding person P has not been detected by the laser detection device 61 (No at S356), the estimating unit 20 of the control device C determines that the notification is unnecessary even if the vehicle V passes through the caution area (S354). On the other hand, if the presence of the preceding person P is actually detected by the laser detection device 61 (Yes at S356), the estimating unit 20 of the control device C determines that the caution area is an attention area where an attention to the preceding person P is to be paid (S357).

[Area Status Determination (Part 2)]

Next, with reference to FIG. 1C, area status determination (part 2) in the notification method in the present embodiment will be described in details. In the area status determination (part 2) in the notification method, explanations of portions (from S351 to S356) the same as those in the area status determination (part 1) are omitted.

In other words, the area status determination (part 2) is featured in that the laser detection device 61 detects whether a plurality of the preceding persons P are present.

In other words, a LiDAP system is used in the laser detection device 61 in the present embodiment to allow the number of the preceding persons P and each distance thereof to be detected. Therefore, if a plurality of the preceding persons P have been dates by the laser detection device 61 as the laser detection process (Yes at S357), the estimating unit 20 of the control device C determines that the caution area is a most attention area in which an attention with respect to the plurality of the preceding persons P is necessary (S359). On the other hand, a plurality of the preceding persons P are not detected by the laser detention device 61 (NO at S357), the estimating unit 20 of the control device C determines that the caution area is an attention area in which an attention with respect to the single preceding person P is necessary (S358).

[Notification Mode Determination]

Figure 11:
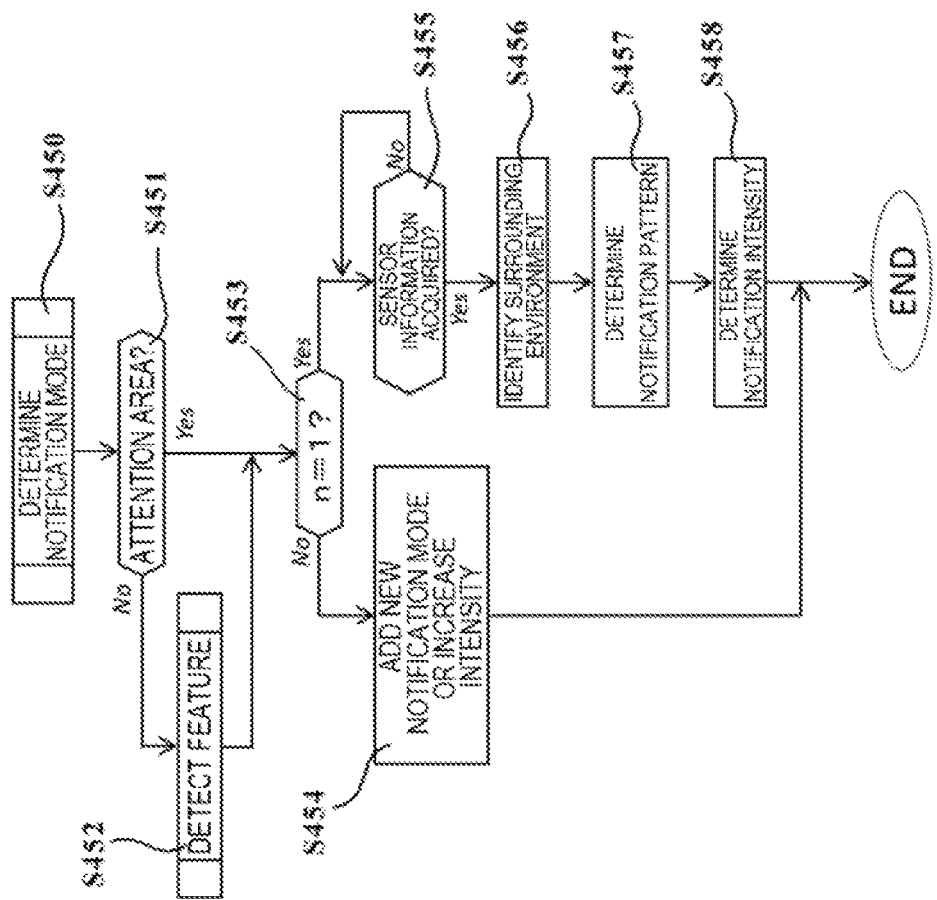
FIG. 11 is a flowchart illustrating a detail of notification mode determination in the notification method in the second embodiment.

Next, with reference to FIG. 11, notification mode determination in the notification method in the present embodiment will be described in details.

In other words, the notification mode determining unit 30 of the control device C determines whether a caution area present on a planned course is an attention area (S451). If the caution area is not an attention area (No at S451), the caution area is the "most attention area" unless otherwise the unnecessity of notification has been already determined, the notification mode determining unit 30 performs the feature detection with respect to the plurality of the preceding persons P (S452).

If the area status determination (part 2) described above is not applied, the process at S452 may be omitted.

Figure 3:
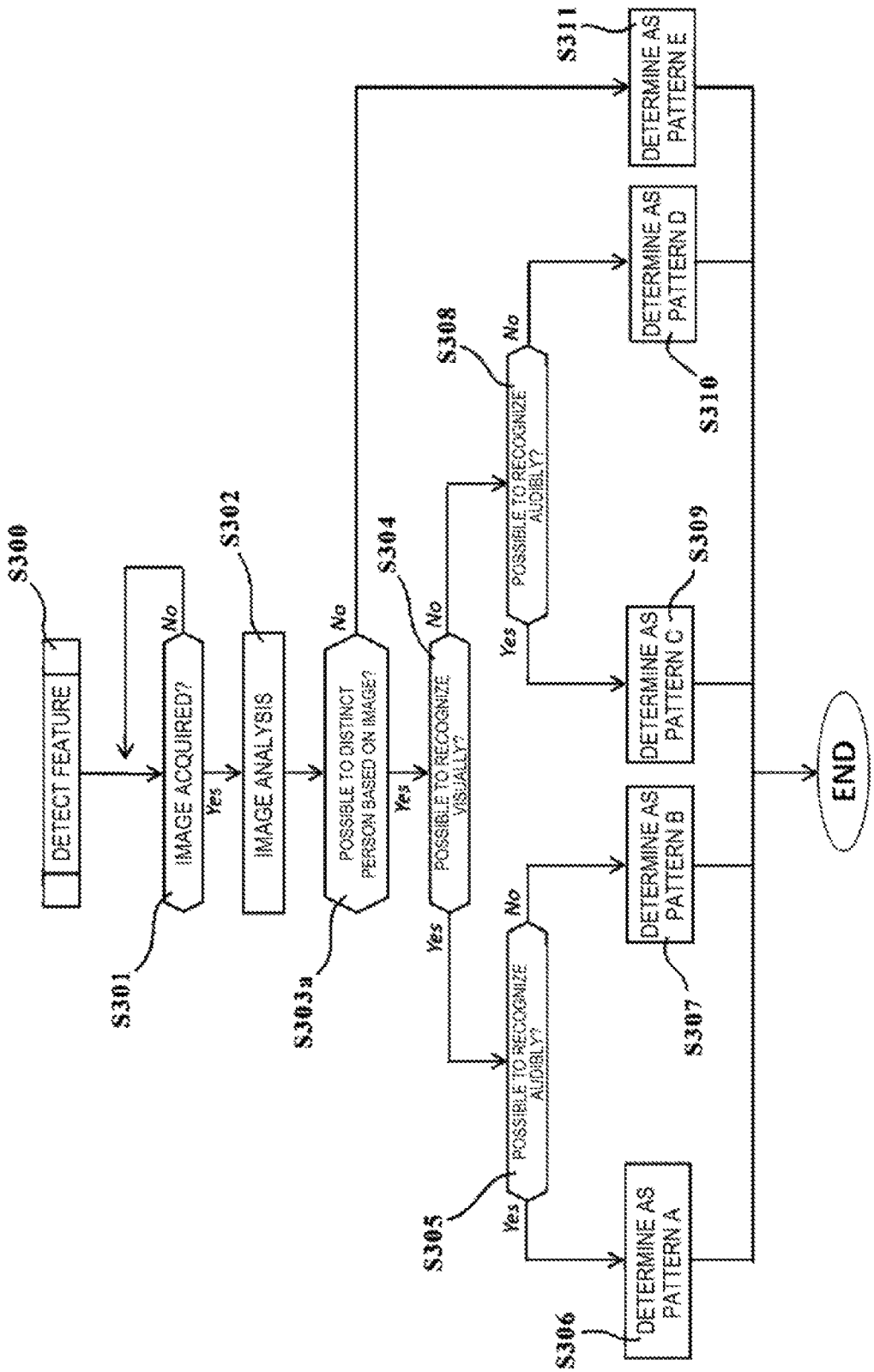
FIG. 3 is a flowchart illustrating a detail of feature detection in the notification method in the first embodiment.
Figure 4:
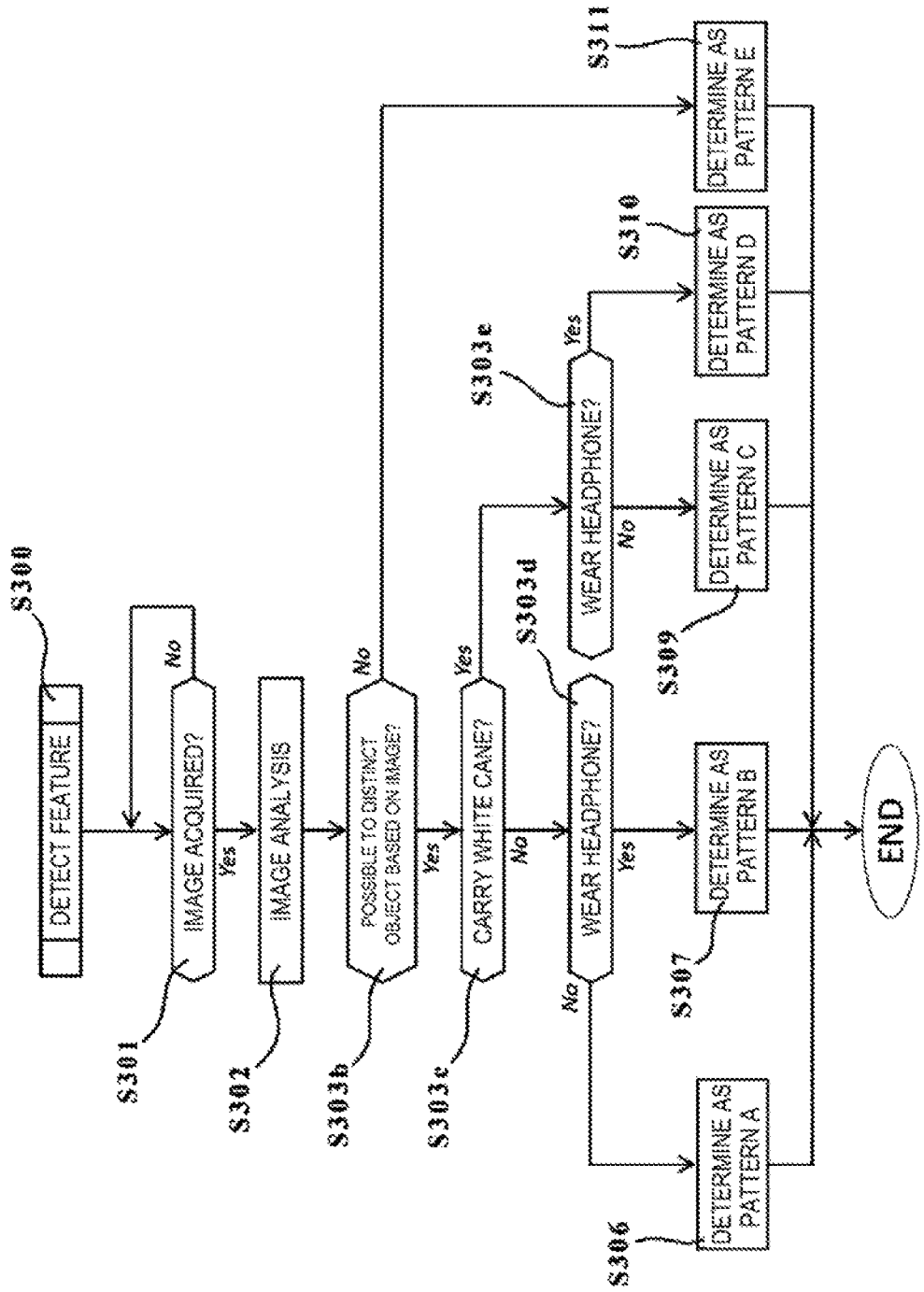
FIG. 4 is a flowchart illustrating a detail of feature detection by another method in the notification method in the first embodiment.

The feature detection having been described using FIGS. 3 and 4, for example, may be applied to the feature detection at S452 above. The results of the person distinction and the object distinction of the preceding person P can be acquired through the process at S452, so that the notification mode determining unit 30 may determine a notification pattern based on the feature of the preceding person P.

If has been determined that the caution area is an attention area at S451 described above and after the feature detection at S452 has been performed, the process is shifted to S453, and the number of notification mode determinations is determined by the notification mode determining unit 30. The contents at S453 and the subsequent steps are similar to those of the notification mode determination (S400) in first embodiment illustrated in FIG. 5 so that the explanation thereof is omitted herein in order to avoid the repeated explanation.

[Notification Control]

At S550, as the notifying process, notification control is performed in accordance with the notification mode by the notification mode determination described above. The notification control in the present embodiment is similar to the notification control (S500) in the first embodiment illustrated in FIG. 6, so that the explanation thereof is omitted herein in order to avoid the repeated explanation.

With the notification device and the notification method in the second embodiment described in the foregoing, it is possible to execute, while accurately determining a traveling status at the vehicle V side, the notification suitable for the status with respect to the preceding person P.

Particularly, the control device C in the present embodiment can determine an area (caution area) where a large number of the preceding persons P are likely to be present from map information, and can select a notification mode by the notification device 40, in accordance with a status (the caution time zone, the actual presence or absence of the preceding person P, or the surrounding environment estimated by the sensor 60) of the area when the vehicle V travels.

Therefore, for example, in a case where a school is present in a planned course of the vehicle V and the vehicle V passes through the planned course in the commute-to-and-from-school time zone, in accordance with statuses in the surrounding environment estimated by the various sensors 60 described above, it is possible to make a notification by the light emitting device 43 when the illumination is low, for example, and add a notification by the air blowing device 44 when the preceding person P with disabilities of a sense of hearing is included.

Moreover, for example, in a case where the vehicle V passes through the caution area at the abovementioned commute-to-and-from-school time, it is possible to make the notification mode of the notification device 40 different based on the passage time when the vehicle V travels in the caution area, for example, selecting a notification mode in which light is combined with the notification of only sound at the time other than, the commute-to-and-from-school time.

In the second embodiment described above, in addition to the information on the area in which the caution is to be exercised, the presence of the actual preceding person P is detected by the laser detection device 61, however, the embodiment is not limited to this example. For example, the estimating unit 20 of the control device C may determine a caution area from the map information described above to estimate an area where a large number of preceding persons P are likely to be present, and the notification controller 50 may operate the notification device 40 regardless of the presence or absence of the preceding person P when the vehicle V travels in the area.

Moreover, the notification controller 50 of the control device C may determine a distance to the preceding person P based on a detection result by the laser detection device 61, and change the notification mode of the notification device 40 (for example, to change the degree of the notification in accordance with the distance, or to switch from the notification device by sound to another notification device by light in accordance with the distance) in accordance with the determined distance to the preceding person P.

Third Embodiment

Figure 12:
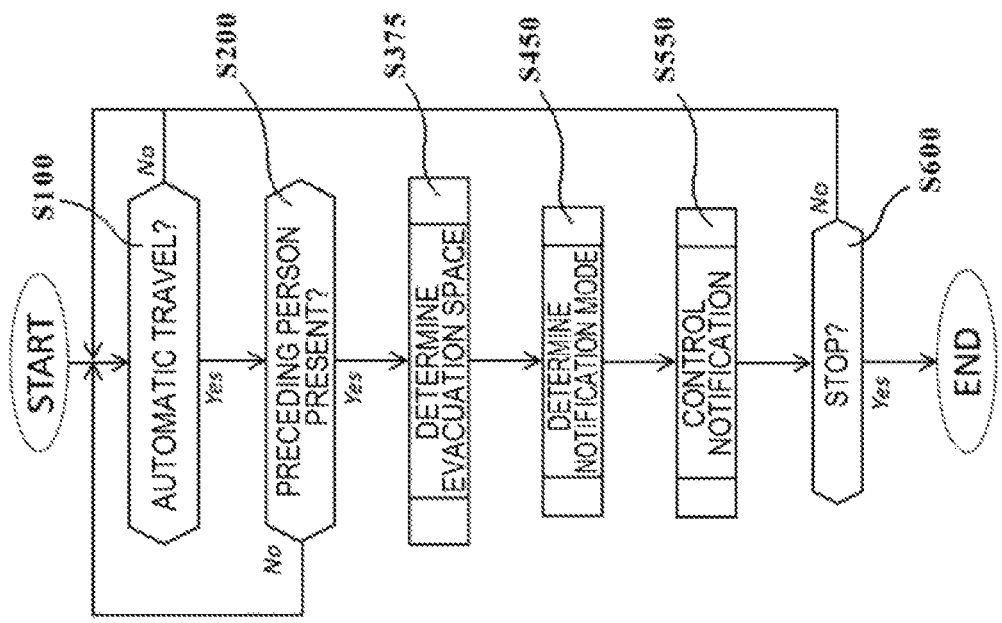
FIG. 12 is a flowchart illustrating a notification method in a third embodiment.

Next, a notification device and a notification method according to a third embodiment will be described with reference to FIGS. 12 and 13. The present embodiment is featured in that the control device C firstly determines, when the preceding person P is present on a planned course, the presence or absence of the evacuation space SP of the preceding person P, and determines a notification mode when the evacuation space SP is present. Also in the present embodiment, the same configurations as already described in the first embodiment and the second embodiment are denoted with the same reference numerals, and explanations thereof are omitted as appropriate.

In other words, the notification method in the present embodiment, similar to the first embodiment, it is firstly determined as to whether the function of automatic traveling (self-driving) is executed in the vehicle V (S100), and is subsequently detected as to whether the preceding person P is present in a planned course of the vehicle V (for example, in a front and a side thereof, or on a planned route set by the navigation device 90) (S200).

If the presence of the preceding person P is detected at S200 described above, the estimating unit 20 of the control device C performs an evacuation space determination as to whether the evacuation space SP of the preceding person P is present (S375). As for the evacuation space determination, for example, the method at S504 having been described using FIG. 7 in the first embodiment is applicable. This allows whether the vehicle V can safely pass the preceding person P to be determined.

The notification mode determining unit 30 of the control device C performs notification mode determination with respect to the preceding person P when the estimating unit 20 determines that the evacuation space SP is present (S450). The abovementioned notification mode determination at S450 having been described in the second embodiment using FIG. 11, for example, is applicable to the notification mode determination. Moreover, as for the notification mode determination in the present embodiment, instead of the abovementioned notification mode determination at S450, for example, the abovementioned notification mode at S400 in the first embodiment having been described using FIG. 5 may be applied.

The notification controller 50 of the control device C then executes control to make a notification with respect to the preceding person P using the notification device 40 in accordance with the notification mode determined by the notification mode determining unit 30 (S550). The abovementioned notification control at S500 having been described in the first embodiment using FIG. 6, for example, is applicable to the notification control. In this case, the evacuation space determination has been already executed in the present embodiment, and the process at S504 in FIG. 6 is thus omitted.

With the notification device and the notification method in the third embodiment described in the foregoing, it is possible to execute, while accurately determining a traveling status at the vehicle V side, the notification suitable for the status with respect to the preceding person P.

Particularly, the control device C in the present embodiment executes the notification with respect to the preceding person P after having determined the presence of absence of the evacuation space SP when the preceding person P is present on the planned course, and thus is prevented from making a notification vainly with respect to the preceding person P under a status where no evacuation space SP is present.

It is noted that the foregoing embodiments are merely suitable examples of the disclosure, and components of the embodiments can be appropriately combined to implement a new structure or new control without departing from the subject matter of the disclosure. Hereinafter, a modified example to which the present embodiment is applicable will be described.

MODIFIED EXAMPLE

Figure 13:
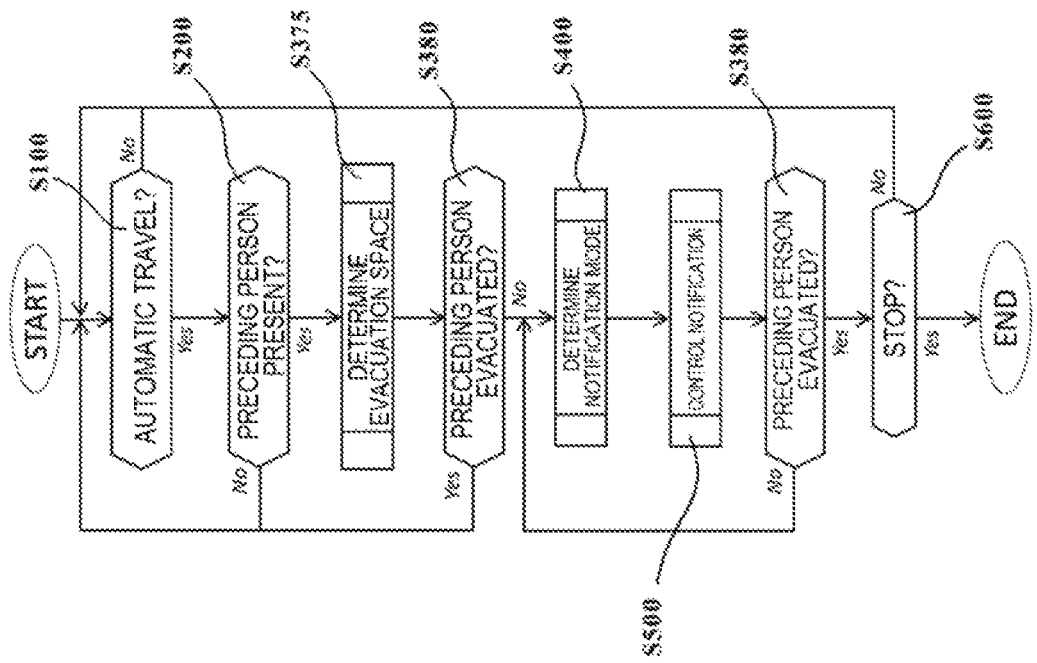
FIG. 13 is a flowchart illustrating a modified example of the notification method in the third embodiment.

FIG. 13 illustrates a notification method in a modified example of the third embodiment.

As apparent from the drawing, after the control device C determines whether the preceding person P has been evacuated (S380) followed by the evacuation space determination (S375), the control device C may execute the notification mode determination and the notification control. In this case, at S380 described above, the estimating unit 20 of the control device C can detect whether the preceding person P has entered into the evacuation space SP, for example, based on the image information acquired by the imaging device 10.

If it is detected that the preceding person P has entered into the evacuation space SP (Yes at S380), the control device C does not execute the notification with respect to the preceding person P thereafter. On the other hand, if it is determined that the preceding person P does not enter into the evacuation space SP after a predetermined time (for example, one minute) has elapsed, the control device C executes the notification mode determination described above (S400).

Moreover, as illustrated in the drawing, after the notification control with respect to the preceding person P (S500), the control device C may determine whether the preceding person P has been evacuated to the evacuation space SP due to the notification (S380). If it is detected that the preceding person P has been entered into the evacuation space SP (Yes at S380), the notification with respect to the preceding person P has completed, and the control device C subsequently determines whether the vehicle V has stopped (S60C).

The embodiments and the modified example of the disclosure has been described in detail above with reference to the accompanying drawings. The disclosure is not limited to the embodiments and the example. It is apparent that those who have ordinary knowledge in the technical field to which the disclosure pertains would conceive further modifications with respect to the embodiments and the modified example within the scope of the appended claims, and it is to be understood that such modifications also fall within the technical scope of the disclosure.

For example, in the respective embodiments and the modified example, the control device C may execute notification by notification device 40, when it has been determined that the number of the preceding persons P is plural based on the information obtained by the imaging device 10 and the laser detection device 61, until at least the head preceding person among the plurality of the preceding persons P is not imaged by the imaging device 10 (in other words, until the head preceding person is not recognized by the control device C).

Moreover, for example, the configuration described in the third embodiment and the modified example thereof may be combined into those in the first embodiment and the second embodiment, as appropriate.

The invention claimed is:

1. A notification device to be mounted on a vehicle and configured to notify a preceding person who precedes the vehicle of a presence of the vehicle during automatic traveling, the notification device comprising:
    an imaging device is configured to image the preceding person;
    an estimating device is configured to estimate at least a characteristic of the preceding person imaged by the imaging device,
        the estimating device estimates a feature of equipment held by the preceding person on a basis of imaging information obtained by the imaging device;
    a determining device is configured to determine a notification mode for the preceding person on a basis of an estimation result by the estimating device; and
    a notification controller is configured to operate a notifying device configured to notify the preceding person of the presence of the vehicle, on a basis of the notification mode determined by the determining device,
        the notification controller changes the notification mode of the notifying device unit in accordance with the equipment of the preceding person.

2. The notification device according to claim 1, wherein the estimating device detects a body height and a motion of the preceding person, on a basis of imaging information obtained by the imaging device, and
    estimates which of an elderly person, an adult other than the elderly person, a child, and a handicapped person the preceding person is likely to be, and
    the notification controller changes the notification mode of the notifying device, in accordance with a type of the preceding person.

3. The notification device according to claim 2, wherein when the preceding person is any one of the elderly person, the adult, and the child, the notification controller cause a sound emitting device serving as the notifying device to emit sound and changes a frequency and/or an amplitude of the sound on a basis of a feature of the preceding person.

4. The notification device according to claim 1, wherein the estimating device identifies a surrounding environment in which the vehicle travels, and
    the notification controller changes the notification mode of the notifying device in accordance with the surrounding environment.

5. The notification device according to claim 4, wherein the estimating device estimates a status in the surrounding environment on a basis of at least one of illumination information, atmospheric temperature information, wind speed information, or rainfall presence/absence information from a sensor mounted on the vehicle, and
    the notification controller changes the notification mode of the notifying device in accordance with the status of the surrounding environment.

6. The notification device according to claim 1, wherein the estimating device estimates from map information an area where a large number of the preceding persons are likely to be present, and
    the notification controller operates the notifying device when the vehicle travels in the area regardless of a presence or absence of the preceding person.

7. The notification device according to claim 1, wherein the estimating device estimates an area where a large number of the preceding persons are likely to be present from map information, and
    the notification controller changes the notification mode of the notifying device on a basis of a passage time during which the vehicle travels in the area.

8. The notification device according to claim 1, wherein when a number of the preceding persons is determined to be two or more on a basis of imaging information obtained by the imaging device, the notification controller operates the notifying device until at least a head preceding person among the two or more preceding persons is not imaged by the imaging device.

9. A notification device to be mounted on a vehicle and configured to notify a preceding person who precedes the vehicle of a presence of the vehicle during automatic traveling, the notification device comprising:
    an imaging device is configured to image the preceding person;
    an estimating device is configured to estimate at least a characteristic of the preceding person imaged by the imaging device, wherein
        the estimating device further estimates a presence or absence of an evacuation space for the preceding person,
    a determining device is configured to determine a notification mode for the preceding person on a basis of an estimation result by the estimating device; and
    a notification controller is configured to operate a notifying device configured to notify the preceding person of the presence of the vehicle, on a basis of the notification mode determined by the determining device, wherein
        when the evacuation space for the preceding person is present, the notification controller operates the notifying device.

10. The notification device according to claim 9, wherein the estimating device estimates a presence or absence of the evacuation space on a basis of at least either one of imaging information obtained by the imaging device and map information.

11. The notification device according to claim 1, wherein
the notification controller determines whether the preceding person has reacted to the notification by the notifying device on a basis of imaging information obtained by the imaging device, and
when determining that the preceding person is not reacted to the notification, the notification controller operates the notifying device to change the notification mode from at a previous time.

12. A notification device to be mounted on a vehicle and configured to notify a preceding person who precedes the vehicle of a presence of the vehicle during automatic traveling, the notification device comprising:

an imaging unit configured to image the preceding person; and
circuitry configured to
estimate at least a characteristic of the preceding person imaged by the imaging unit,
estimate a feature of equipment held by the preceding person on a basis of imaging information obtained by the imaging unit,
determine a notification mode for the preceding person on a basis of an estimation result by the estimating, and
operate a notifying unit configured to notify the preceding person of the presence of the vehicle, on a basis of the determined notification mode, wherein the circuitry changes the determined notification mode of the notifying unit in accordance with the equipment of the preceding person.

* * * * *